(12) United States Patent
Mellen et al.

(10) Patent No.: US 8,325,989 B2
(45) Date of Patent: Dec. 4, 2012

(54) SMART IDENTITY SYSTEM

(75) Inventors: Daniel Mellen, Falls Church, VA (US);
Paul Kolebuck, Leesburg, VA (US);
Gayle Nix, Fairfax, VA (US)

(73) Assignee: Accenture Global Services Limited, Dublin (IE)

(*) Notice: Subject to any disclaimer, the term of this patent is extended or adjusted under 35 U.S.C. 154(b) by 960 days.

(21) Appl. No.: 12/056,723

(22) Filed: Mar. 27, 2008

(65) Prior Publication Data
US 2009/0080708 A1    Mar. 26, 2009

Related U.S. Application Data

(60) Provisional application No. 60/974,701, filed on Sep. 24, 2007.

(51) Int. Cl.
*G06K 9/00* (2006.01)
(52) U.S. Cl. ........ 382/115; 382/116; 382/117; 382/118; 382/119; 382/123; 382/124; 382/128; 382/232
(58) Field of Classification Search .............. 382/115, 382/116, 117, 118, 119, 123, 124, 128, 232, 382/125
See application file for complete search history.

(56) References Cited

U.S. PATENT DOCUMENTS

| | | | |
|---|---|---|---|
| 4,993,068 A * | 2/1991 | Piosenka et al. | 713/186 |
| 6,351,817 B1 | 2/2002 | Flyntz | |
| 6,636,620 B1 | 10/2003 | Hoshino | |
| 2004/0052404 A1 * | 3/2004 | Houvener | 382/115 |
| 2007/0118745 A1 * | 5/2007 | Buer | 713/168 |
| 2007/0250920 A1 * | 10/2007 | Lindsay | 726/7 |

FOREIGN PATENT DOCUMENTS

| | | |
|---|---|---|
| CN | 1221160 | 6/1999 |
| EP | 1 231 531 A1 | 8/2002 |
| EP | 1 394 655 A2 | 3/2004 |
| GB | 2 331 825 A1 | 11/1998 |
| WO | WO 01/27723 | 4/2001 |

OTHER PUBLICATIONS

European Office Action for Application No. 08 802 562.2-2212 dated Mar. 27, 2012 (5 pages).
Chinese Agent Frank Xun Feng, First Office Action for Application No. 200880108341.3 mailed Mar. 29, 2012 7 pages.
EP Summons for Application No. 08802562.2, dated Jul. 24, 2012, 1 page.
EP Summons for Application No. 08802562.2, dated Jul. 5, 2012, 5 pages.

* cited by examiner

*Primary Examiner* — Mike Rahmjoo
(74) *Attorney, Agent, or Firm* — Fish & Richardson P.C.

(57) ABSTRACT

Biographic data associated with a user is received. Biometric data associated with the user is also received. External data associated with the biographic data and the biometric data is received and a determination is made as to a level of access to grant the user based on the external data. One or more settings associated with a smartcard are configured based on the level of access.

20 Claims, 5 Drawing Sheets

SMART IDENTITY SYSTEM

This application claims priority to U.S. Provisional Patent Application Ser. No. 60/974,701 filed Sep. 24, 2007, and entitled "SMART IDENTITY SYSTEM," the contents of which are incorporated herein by reference.

BACKGROUND

This disclosure relates to information access.

Around the world, concerns about the growing threat to information security and the challenges of regulatory compliance are at an all time high. As organizations open their doors to new technologies, suppliers, partners, employees, and customers, the organizations expose themselves to new risks. Organizations do not often times enhance their IT security to provide controlled, secure access to their information and assets.

The ability to identify individuals is a fundamental requirement for many efforts to enhance security and assurance levels. Identification enables informed eligibility determinations, risk assessments and enforcement decisions. Government and commercial agencies must be able to consistently, accurately, efficiently, and often, remotely identify individuals and connect them to the relevant information whenever they interact with the enterprise. Technology developments and scientific progress in areas such as biometrics are paving the way for new solutions to meet these challenges.

SUMMARY

Disclosed herein are systems, apparatus and methods for identifying individuals and providing access to systems. In one implementation, biographic data associated with a user is received. Biometric data associated with the user is also received. External data associated with the biographic data, the biometric data is received, and a determination is made as to a level of access to grant the user based on the external data. One or more settings associated with a smartcard are configured based on the level of access.

In another implementation, biometric data associated with a user is received. The biometric data is provided to be compared with one or more external databases. External data associated with the biometric data is received, and a determination is made as to a level of access for the user to one or more systems based on the external data. The user is allowed access to the one or more systems with the biometric data.

In another implementation, a comparison of the biometric data with one or more external databases is received, and the comparison is associated as the external data.

In another implementation, the external data is compared with one or more conditions associated with a system, and the level of access to the system is determined based on whether the one or more conditions are met by the comparison.

In another implementation, a system includes a processor, and a computer-readable medium coupled to the processor and having instructions stored thereon, which, when executed by the processor, causes the processor to perform operations comprising: receiving biographic data associated with a user, receiving biometric data associated with the user, receiving external data associated with the biographic data and the biometric data, determining a level of access to grant the user based on the external data, and configuring one or more settings associated with a smartcard based on the level of access.

DETAILED DESCRIPTION

Figure 1:
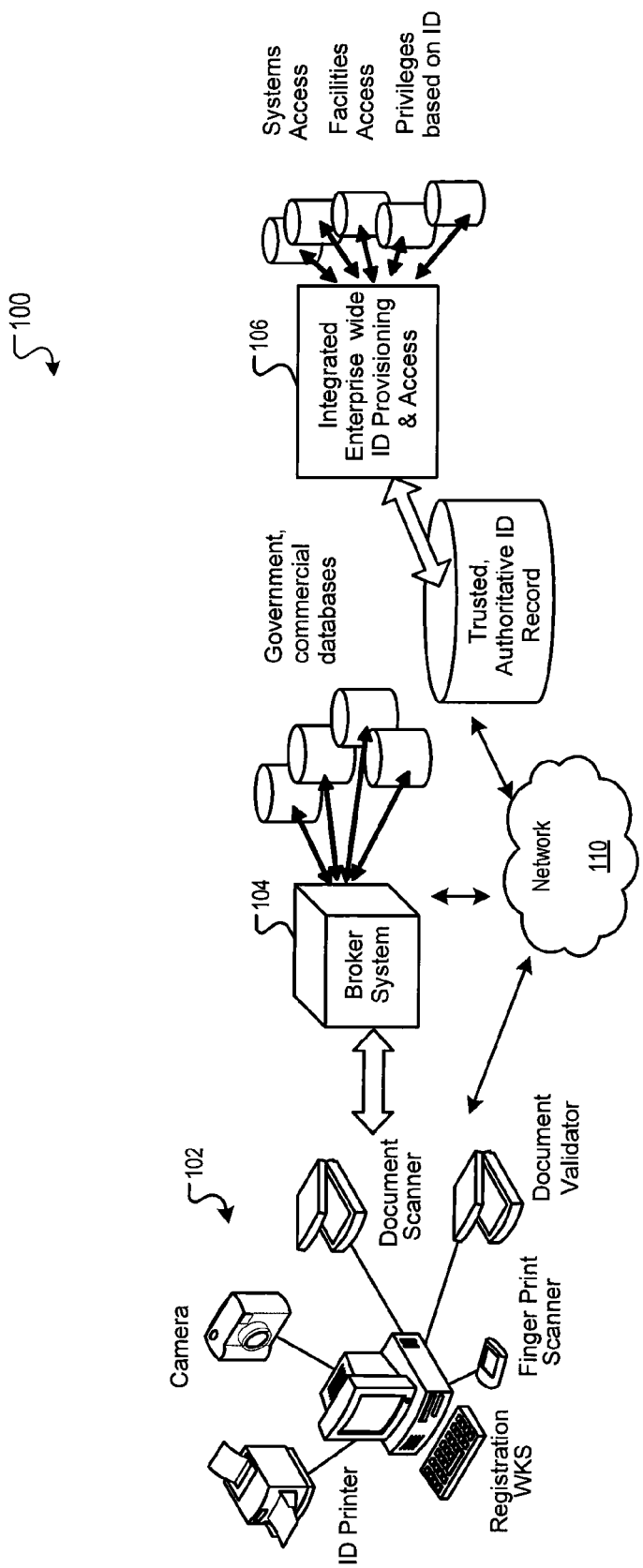
FIG. 1 is a block diagram of an example smart security system.

FIG. 1 is a block diagram of an example smart security system 100. The system 100 may establish trusted identity, and may provision the trusted identity across an enterprise. A computer network 110, such as a local area network (LAN), wide area network (WAN), the Internet, or a combination thereof connects a credential collector 102, a broker system 104, and an access system 106.

In one implementation, the credential collector 102 may collect various biometric and biographic data from one or more users. The biometric and biographic data may be used for document authentication, as well as for card management, biometric smartcard issuance, and corporate human resource integration, as will be described in detail below.

In one implementation, the broker system 104 may be used for identity verification services. The broker system 104 may, for example, verify the biographic data received through the credentials collector 102 against government, commercial, and local databases. The broker system 104 may also verify the biometric data received through the credentials collector 102 against government, commercial, and local databases.

The access system 106 may provision the identity of users and grant access to the users based on the data received from the broker system 104 and evaluated by the access system 106. The access system 106 may, for example, use trusted, or strongly authenticated, identity records across the system 100. The access system 106 may grant access privileges across numerous systems and facilities integrated and aligned to strong authentication identification.

The smart security system 100 may integrate strong identity establishment capabilities with leading provisioning and access management capabilities. The system 100 may deliver enterprise identity management capabilities to government and commercial clients. The system 100 may, for example include biographic and biometric enrollment, multi-modal biometrics, document authentication, identity verification queries against public and private sources, biometric matching and validation, biometric/public key infrastructure (PKI) enabled smartcard issuance, card management, integration with commercial enterprise resource planning (ERP) solutions, and enterprise-wide integration with logical and physical access control, as will be described in greater detail below.

In one implementation, the smart security system 100 may integrate numerous, best in class, identity management technologies and deliver numerous benefits. The benefits may, for example, include reduced solution delivery cost and timeframes (reduced up-front integration effort), highly inter-operable assets enabling better leveraging/integrating of existing investments based on preference/requirements, assorted reduction in identity/card related administrative costs, reduced corporate risk through strong identity establishment, and integrated logical and physical access management, based on strong identity. Strong identity refers to when a user has been confirmed by the smart security system.

Figure 2:
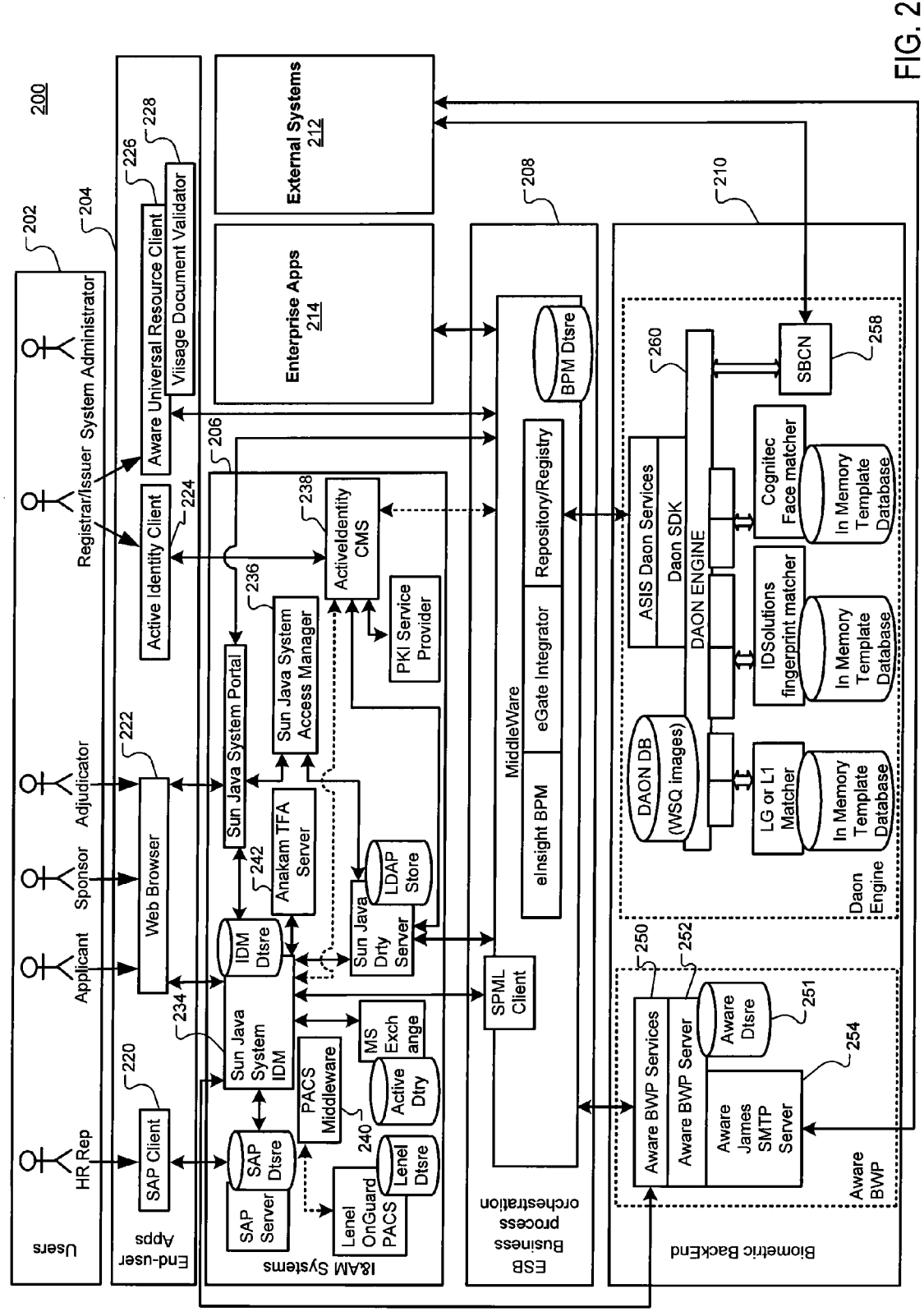
FIG. 2 is another block diagram of an example smart security system.

FIG. 2 is another block diagram of an example smart security system. The smart security system 200 may include one or more users 202, end-user applications 204, identity access management (IAM) systems 206, an enterprise service bus 208, and a biometric backend system 210, all connected by a LAN, (WAN), the Internet, or a combination thereof. The system 200 may, for example, utilize one or more computing devices that include memory devices storing processing instructions and processing devices for executing the processing instructions. An example computing system is shown and described with reference to FIG. 5. Other implementations, however, may also be used.

In one implementation, the end user applications 204 may collect biographic and biometric data from the users 102. The users 202 may include users that may have to access one or more systems associated with the system 200. Before a user 202 is granted access, the smart identity system 200 may determine whether any security concerns exist with the user 202, such that the level of access to the user for any systems should be limited in any way. Depending on the information collected about the user 202, various systems and programs may be accessed by the user 202 in a limited or non-limited way. The system 200 may, for example, determine the level of access by gathering biographic and biometric data from the user 202.

In one implementation, biographic data may, for example, include the user's name, height, weight, hair color, physical markings including birthmarks, tattoos, scars, address, age, social security number, employee type, position, manager, etc. The biographic data may also be associated with identities associated with the user 202. The end user applications 204 that may collect the biographic data may, for example, include one of several types of enterprise applications that are available from several software application providers 214 such SAP, Walldorf, Germany and Oracle.

The biometric data may, for example, include permanent physiological traits or physical human characteristics. Biometric data may include voice patterns, fingerprint/thumbprints, palm prints, hand/wrist vein patterns, retinal/iris eye scans, hand geometry/topography, keystroke dynamics, typing rhythms, DNA, signatures, and facial digital pictures. The end user applications 204 used to collect the biometric data may, for example, include voice recognition/verification systems, fingerprint/thumbprint identification systems, palm print systems, hand/wrist vein pattern recognition systems, retinal/iris eye scanners, hand geometry/topography systems, systems that recognize keystroke dynamics or typing rhythms, systems that receive and analyze DNA, and systems used to obtain signatures.

The biographic and biometric data may be collected at an initial enrollment of a user 202. Therefore, before the user 202 is granted any access to any program or application in the system 200, the biographic and biometric data are first collected. In another implementation, the biographic and biometric data may be collected at more than one instance even after the system 200 grants access to the user 202 based on the initial enrollment. For example, the biometric data may be collected again after a predetermined period has passed after the user 202 has been granted access to the applications and programs in the system 200.

The applications 204 may, for example, include applications 204 used for smart card management and card issuance capabilities based on the gathered biometric and biographic data, as will be described further below. The application 204 may for example, include an SAP client 220, a web browser 222, a client 224, and an L-1 Viisage document validator 228.

The applications 204 may also include specific applications for integrating with biometric data collection systems. Such application may include the Aware Universal Resource client 226, as provided by Aware, Bedford Mass. The applications may also include an application for client-side document validation. For example, the software may be i-authenticated provided by L1 communications.

The identity access management systems 206 may manage identities and workflow processes associated with creating accounts and other downstream enterprise systems. The identity access management systems 206 may communicate with card management system to manage the users and accounts.

The identity access management systems 206 may include a system 234 for managing the identity of users 102 and may provide web services to interact with user's identity and profiles. The system 234 may support pre-enrollment processes, enrollment processes, adjudications processes after identification verification, and access modification processes. The system 234 may, for example, be the Sun Java System Identity Management Server provided by SUN Microsystems, Inc. of Santa Clara, Calif. The systems 206 may also include one or more data stores to store the biographic and biometric data obtained about each of the users 102.

In one implementation, the identity management systems 206 may include a system 236 that may serve as a logical access control provider. The system may, for example, be implemented as the SUN Java System Access Manager provided by SUN Microsystems, Inc. of Santa Clara, Calif.

In one implementation, the identity management system 206 may include a system 236 that serves as central point for signal sign on using a web-agent based approach. The system 236 may, for example, be implemented as the SUN Java System Access Manager.

In one implementation, the identity management systems 206 may include an active identity card management system 238 for supporting card issuance of smartcards. The system 238 may also manage certificate issuance and storage. The card management system may, for example, be provided by Active identity Fremont, Calif.

In one implementation, the end user applications 204 may submit the received biographic and biometric data to external systems 212 to determine whether any external databases contain information about the user 202. The end user applications 204 may, for example, also compare the biometric and biographic data with internal databases that contain information about the user 202.

The external systems 212 may, for example, compare the received biometric and biographic data to determine whether the systems contain any information associated with the biometric or biographic data. The information in the external systems 212 may be categorized according to the biographic and biometric data. Therefore, the external systems 212 may search the databases by the biographic and biometric data. The biometric data may, for example, be compared against government agency databases, commercial databases, as well as the Automated Fingerprint Identification System (AFIS) database. The external systems 212 may include various data associated with the user, and the various data may be stored according to the biometric and biographic data associated with the user. The external systems 212 may, for example, include any traffic violations associated with a user, criminal records associated with the user, or whether the user is on a watch list by any government agency. The external systems 212 may also include information on a user's credit, bankruptcy, and property ownership. For example, financial records received by the system 200 may show that the user has a poor credit history, and therefore the user's access to particular systems may be limited in light of the financial history.

In one implementation, the system 200 may include one or more backend systems 210 that may analyze the biographic and biometric data and the external data received from the external system 212. The backend systems 210 may include Aware BWP Services 250, Aware BWP Server 252, and Aware James SMTP server 254, provided by Aware, Bedford Mass. The backend systems 210 may also include a DAON Database, provided by DAON Reston, Va.

In one implementation, the backend system 210 may include interfacing with a broker system such the Security Biometric Clearing Network (SBCN) 258, to receive information about back background checks, etc.

The backend system 210 may include a system that supports enrollment, identification verification initiation, and identification verification completion processes. The system that supports these processes may, for example include the AWARE BWP Services 250, provided by Aware, Bedford Mass. The backend systems 210 may also include a data store 251 to store the biometric data received from the users 102. The backend systems 210 may also include a biometric engine 260 to support biometric enrollment, identification verification processes, biometric storage, and uniqueness checks.

In one implementation, the backend systems 210 may receive the external data from the external systems 212 and evaluate the external data. The backend systems 210 may, for example, determine whether the user 202 associated with the external data should be granted access to one or more systems, applications, or assets based on the received data.

In one implementation, the backend systems 210 may configure one or more business rules associated with the system 200. The business rules may, for example, require one or more portions of a user's external data associated with biographic or biometric data to reflect a predetermined amount or pass a predetermined threshold, and if the rule is met, then the user 202 may be granted access to the system associated with the specific business rule. The business rules may, for example, require that the user 202 be associated with no traffic violations, or have no security concerns as determined by the external systems 212.

In one implementation, the backend systems 210 may grant various levels of access to the user 202 to one or more systems or applications within the system 200 or outside of the system 200 based on the external data received from the external systems 212. The backend systems 210 may, for example, also grant various levels of access based on whether the business rules were satisfied. For example, a user 202 may be granted full access to an application A in the system 200, but may not be granted any access to application B. In another example, the user 202 may be granted access to a certain room within a company, but may be denied access to other rooms.

The backend system 210 may associate the various levels of access with a smartcard associated with the user 202. Therefore, a user 202 may access the systems and programs by using the smartcard. In one implementation, the various levels of access may be stored on the smartcard. In another implementation, the various levels of access may be stored on the backend systems 210 and transmitted to the smartcard. The user 202 may, for example, access any application or system using the smartcard, instead of a login.

In one implementation, the backend system 210 may associate access to users to systems using a two-system access approach. The user 202 may therefore access the systems using two separate access methods. The access methods may include a smart card, or any other card, FOB, or RFID card as described below, as well as a password or the user's biometric. For example, a user may be granted access to a system with a smartcard as well as the user's fingerprint.

In one implementation, the access levels may be associated with other cards such as a chip card, or integrated circuit card (ICC), a Mag card, RFID card, a key FOB, a USB key, mobile devices, and tokens. Therefore, the backend system 210 may configure each of these, for example, the USB key or key FOB, with the access levels.

In one implementation, the system 200 may also include an enterprise service bus 208 that may serve as a middleware backbone. The enterprise service bus 208 may, for example, provide business process management services and may integrate with the IAM systems 206 and the biometric backend systems 210. The middleware may, for example, be implemented as SUN Java CAPs, provided by SUN Microsystems, Inc. Santa Clara, Calif.

In one implementation, the system 200 also utilizes a physical access security management engine 240 that allows security managers to integrate with and deploy access rules across heterogeneous physical security applications, systems and devices without requiring custom code. This capability is engineered to make physical security management fast, easy, and cost-effective by centralizing and automating what has traditionally been a manual and error-laden process.

In one implementation, the system 200 provides comprehensive security to the web services in the SOA environment, via a Layer 7 capability. This security ensures only authorized access to web services, and prevents information being passed by these services from being tampered with and maintains system integrity without impacting the application itself.

In one implementation, as an alternative to utilizing smartcards as the second factor user authentication, the system 200 may integrate with the Anakam.TFA™ 242 two-Factor Authentication capability. This eliminates the need for end-user hardware and software-based two-factor solutions. The capability delivers true two-factor authentication through the use of every day devices that are already in the hands of the user—such as cell phones, home phones, web connected computers, and office phones. For example, the every day devices can be used to authenticate the user. A cell phone number of a user may be associated with only one user. Therefore, based on the user's cell phone number, the user's identity can be established.

The following processes and sub process may be implemented by the system 200:

Government PIV Compliant Identity Establishment Process. This is the main business process. This chart summarizes the activities that occur in this process.

| Name | Description | Roles |
|---|---|---|
| Start PreEnrollment | | |
| RequestInit | Applicant Initiates Request. Creates task item in Sponsor's worklist. | All Users |
| RequestSponsorship | Sponsor/Manager approves/rejects request from worklist. The system must wait after this for enrollment input. | Manager/Sponsor |
| Enrollment | Receives input from a separate business process that receives Aware URC message for enrollment and correlates with existing process instance. | System |
| IDVerificationInit | Updates status that External AFIS Verification Initiated. The system waits for a | System |

-continued

| Name | Description | Roles |
|---|---|---|
| CardIssuance | message after this to CardIssuance status. Updates status that Card Issued. After this waits for a message to IDVerificationCompletion. | System |
| IDVerificationComplete | Receives input from Aware BWP about verification completion info and correlates with existing process instance. Creates a taskitem in Adjudicator's worklist. | System |
| Adjudication | Adjudicates request as approved or rejected. | Adjudicator |
| CardActivation | Updates status that card is activated after receiving input from IDM and correlates to existing process instance. | System |
| EnrollmentFailure | Enrollment failure occurs because of 1: Many match failure. Updates status that 1: Many match failed. Notifies sponsor. | System |
| AdjudicationFailure | Failure because of IdVerification failure. Notifies applicant, sponsor. | System |

RequestInit Sub-Process. This chart summarizes the activities that occur in this process.

| Name | Description | Roles |
|---|---|---|
| StartRequestInit | Initial Mapping | |
| RetrieveEmployeNumberFromSS | This activity retrieves the EmployeeNumber user attribute using the SSO API of Sun AM. This activity is mapped to a JCD that reads Http headers off the HttpRequest for the web application. The empnum is retrieved from the header and passed to the next activity. | BPM |
| RetrieveGEIAUserFromIDM | This activity uses the EmployeeNum to retrieve Applicant's user attributes from IDM. This is implemented by a JCD that invokes a searchByEmplyeeNumber method on GEIASPMLManager Java Object. Gets a GEIAUser Java Object. Passes on the GEIAUser object to the next activity. | BPM |
| ShowRequestInitiationPage | This activity displays Credential Request Page. The fields are populated from the information in GEIAUser Java object. Applicant clicks 'Submit Request' after verifying information to continue with the process. | All Users |
| ValidateRequest | This activity confirms employment is appropriate for a PIV request. | BPM talking to IDM |
| PersistRequest | This activity invokes GEIASPMLManager updateCredentialRequested status to save the information in IDM (using accounted/employeenum as the user identifier). This activity also saves BAM information in eInsight Database. | BPM |

-continued

| Name | Description | Roles |
|---|---|---|
| EndRequestInit | Complete Request Init Sub-Process. This generates a task in the worklist for the sponsor/manager. | BPM |

RequestSponsorship Sub-Process. This chart summarizes the activities that occur in this process. At the end of this, the top level process, waits to be notified by the Enrollment Applicant to continue with the top level process (section 9.2.1), and waits to receive a message from the Enrollment Application to continue.

| Name | Description | Roles |
|---|---|---|
| BeginSponsorRequest | Initial Mapping | |
| ReadReqFromDatabase | This activity retrieves request details, and uses the employeenum to read request details from the datastore | BPM |
| ShowSponsorPage | This activity displays the Sponsorship Page. Sponsor/Manager approves/rejects request on this page. | Manager/Sponsor |
| ValidateSponsorship | In this activity, the system validates the sponsor's empnum against the empnum in the applicant record. | BPM |
| PersistDescision | Decision is persisted by invoking GEIASPMLManager updateSponsorship status method. Request data in BPM is updated. | BPM |
| PrepareEmail | Applicant information is used to create email | BPM |
| SendEmail | Email is sent to applicant about sponsorship decision | BPM |
| ShowAckPage | Displays Sponsorship acknowledgement page. Process completed when Sponsor clicks on the exit button. | BPM/Manager |
| EndSponsorReq | End of request mapping. Create WSD response | BPM |

Enrollment Sub-Process. This process is invoked by an independent Business Process (or JCD) receiving request from a Biometric Enrollment Application e.g. Aware URC. This avoids saving the huge NISTXML data in the BPI datastore. The JCD is exposed as a web service using the Aware BWP WSDL (so that Aware URC can invoke it) and will also invoke the Aware BWP Web Service endpoint for enrollment.

| Name | Description | Roles |
|---|---|---|
| StartEnrollment | Initial Mapping | |
| Correlate | Uses the EmployeeNum as the correlation ID of the process instance | BPM |
| ValidateEnrollment | Validates Applicant Employment and Sponsorship | BPM |
| PeristStatus | Invokes one2ManyMatchStatus method on GEIASPMLClient Java object and passed the EmployeeNum. | BPM |

-continued

| Name | Description | Roles |
|---|---|---|
| UpdateBAM | Update BAM Info | |
| EndEnrollment | End | |

ID Verification Initiation Sub-Process. Summary of activities in this process.

| Name | Description | Roles |
|---|---|---|
| StartIDVeritication | Initial Mapping | |
| PersistStatus | Invokes GEIASPMLClient updateIDVerificationStatus method to update user attribute in IDM. | BPM |
| UpdateBAM | Update BAM Information | BPM |
| EndVerification | Complete Mapping | |

Card Issuance Sub-Process. This process is kicked off by the Polling Process when the cardIssuance status in IDM is changed to true for a user.

| Name | Description | Roles |
|---|---|---|
| StartIssuance | Initial Mapping | |
| PersistInformation | Persist Card Issuance Status in BPM datastore | BPM |
| UpdateBAM | Update BAM Information | BPM |
| EndIssuance | Complete Mapping | |

ID Verification Completion Sub-Process. This process is kicked off when Aware BWP invokes this web service with empnum as the correlation key.

| Name | Description | Roles |
|---|---|---|
| StartCompletion | Initial Mapping | |
| Correlate | Correlate to existing process instance using employee number | BPM |
| PersistInformation | Call GEIASPMLClient update IDVerficationStatus method. | BPM |
| UpdateBAM | Update BAM Information | BPM |
| EndCompletion | Complete Mapping. Add task item to Adjudicator worklist. | |

Adjudication Sub-Process. This is a review process similar to the sponsorship sub-process with the adjudicator interacting with the system instead of the sponsor.

Card Activation Sub-Process. This is substantially similar to the Card Issuance process. This process is kicked off when the cardActivation attribute in IDM is changed to true.

Enrollment Failure Sub-Process. This is substantially similar to the Card Issuance process. Only the failure information is saved instead of issuance information. In addition, emails are sent to sponsor as an additional activity.

Adjudication Failure Sub-Process. This is substantially similar to the Card Issuance process. Only the failure information is saved instead of issuance information.

Aware URC Enrollment Submission Process. This process is a web service that implements the BioEnroll WSDL from Aware. This process will be invoked by the Aware URC on enrollment completion to pass biometric information. This process invokes the Aware BWP service endpoint with the same message. In the next step it sends a message to the main Business Process waiting to proceed with Enrollment sub-process. It correlates using the employee num.

Card Issuance Polling Process. This process polls for the cardIssuance attribute in IDM for all users who have completed the IDVerificationInit activity. Once the cardIssuance attribute changes to true it sends a message into the Identity Establishment Business Process (9.2.1) with Empnum as the correlation key to keep that process going.

Figure 3:
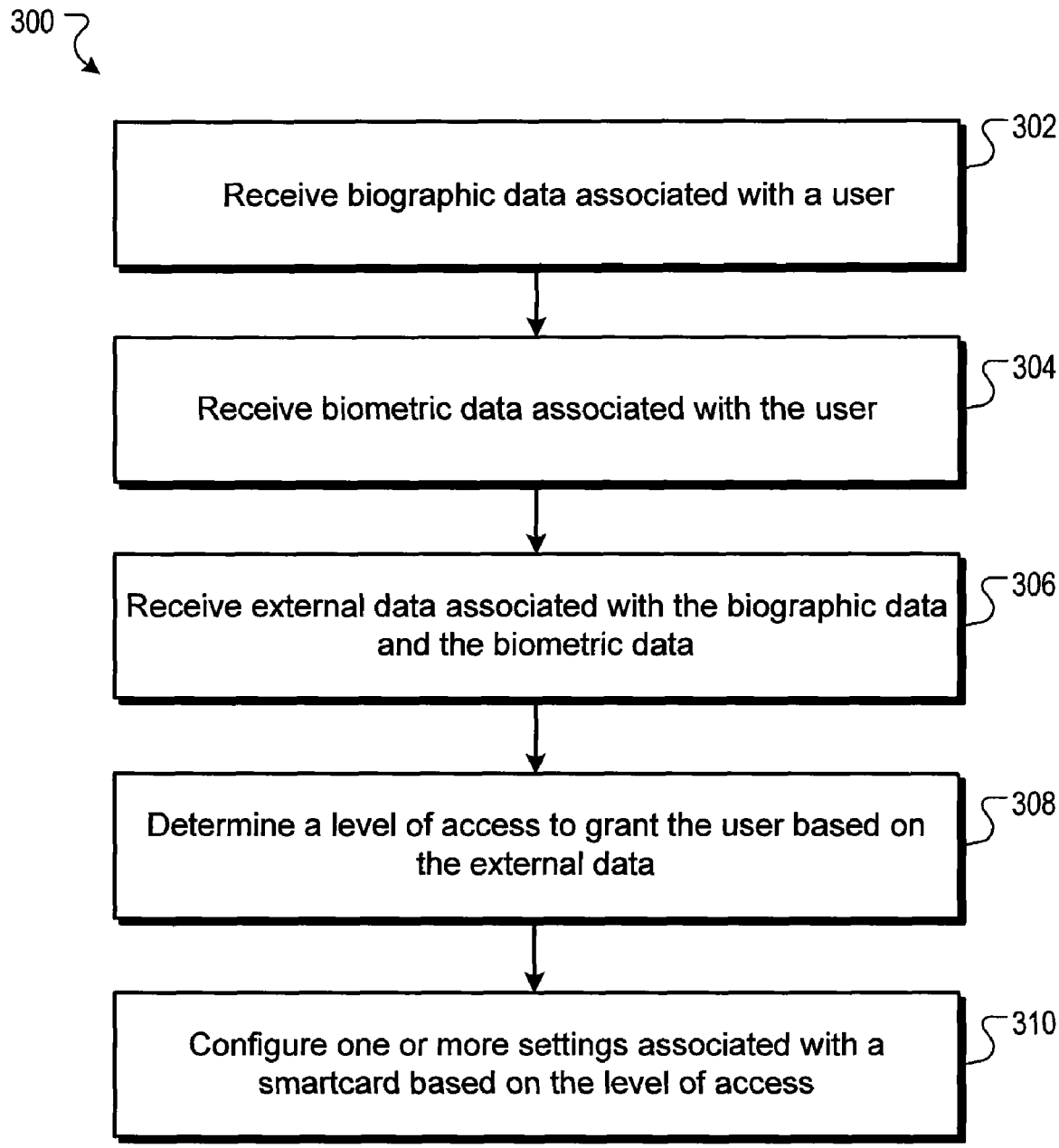
FIG. 3 is a flow diagram of an example process for determining access levels.

FIG. 3 shows an example process 600 for providing access to a user based on biometric data. The process 300 may, for example, be implemented in a system such as the smart identity system 200 of FIG. 2.

Stage 302 receives biographic data associated with a user. For example, the end user applications 204 may receive biographic data associated with a user 202.

Stage 304 receives biometric data associated with the user. For example, the end user applications 204 may receive biometric data associated with a user 202.

Stage 306 receives external data associated with the biographic data and the biometric data. For example, the system 200 may receive external data associated with the biographic data and the biometric data from the external systems 212.

Stage 308 determines a level of access to grant the user based on the external data. For example, the backend systems 210 may determine a level of access to grant the user 202 based on the external data.

Stage 310 configures one or more settings associated with a smartcard based on the level of access. For example, the backend systems 210 may configure one or more settings associated with a smartcard based on the level of access.

Figure 4:
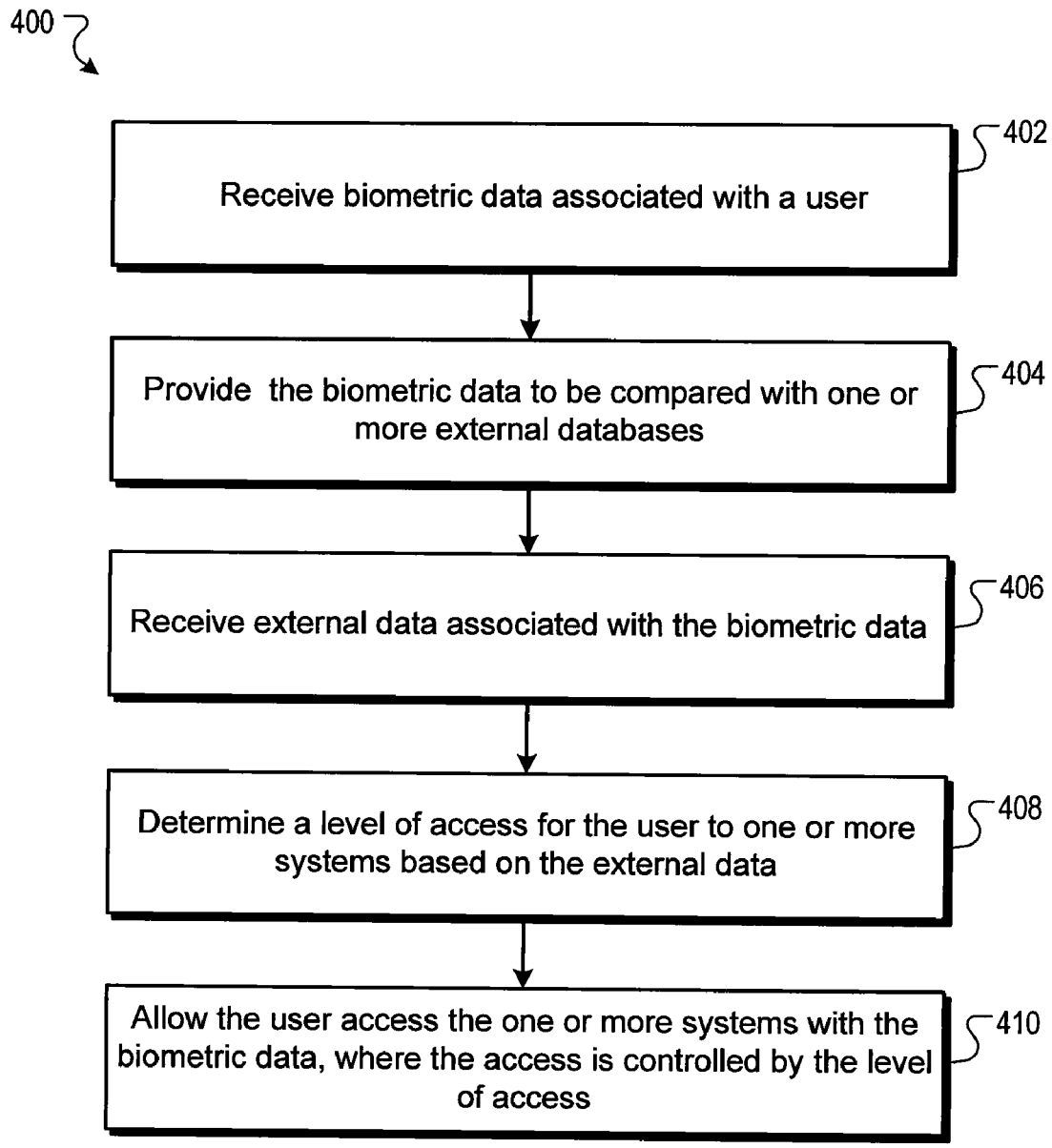
FIG. 4 is another flow diagram of an example process for determining access levels.

FIG. 4 is an example process 400 for providing access based on biometric data. The process 400 may, for example, be implemented in a system such as the smart identity system 200 of FIG. 2.

Stage 402 receives biometric data associated with a user. For example, the end user applications 204 may receive biometric data associated with a user 202.

Stage 404 provides the biometric data to be compared with one or more external databases. For example, end user applications 204 may provide the biometric data to be compared with one or more external databases.

Stage 406 receives external data associated with the biometric data. For example, the backend systems 210 may receive external data associated with the biometric data.

Stage 408 determines a level of access for the user to one or more systems based on the external data. For example, the backend systems 210 may determine a level of access for the user 202 to one or more systems based on the external data.

Stage 410 allows the user access the one or more systems with the biometric data, where the access is controlled by the level of access. For example, the backend systems 210 may allow the user 202 access to the one or more systems with the biometric data.

In one implementation, the system 200 may be used with travel security services where the system may use electronic passports (e-passports), multimodal biometrics, automated gates, kiosks, two-dimensional (2D) barcode boarding passes, radio frequency identification (RFID) baggage tags and mobile devices to streamline passenger check-in, emigrating, boarding and arrival security operations to the benefit of all key stakeholders in air travel. The system 200 may include three separate modules, pre-travel, departure, and arrival.

The pre-travel module may use a biometric station comprising of multiple biometric devices and an e-passport or smartcard reader/write to register a traveler and issue an e-passports or a registered traveler contactless smartcard. The pre-travel module may also include an application to manage privileges and government watch lists.

Figure 5:
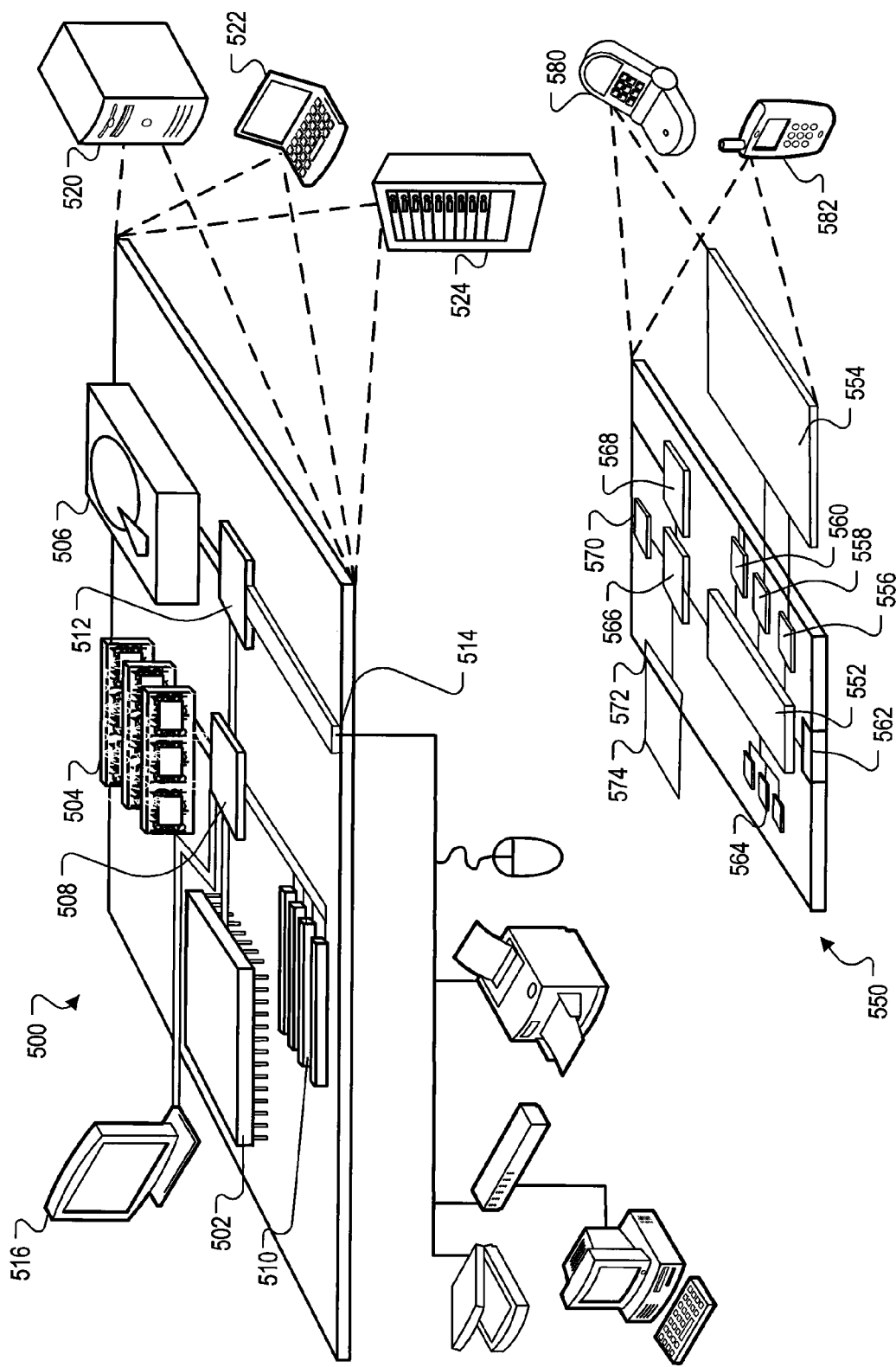
FIG. 5 shows an example of a generic computer device and a generic mobile computer device.

The departure module may use multiple biometric scanners (fingerprint, iris and face), an e-passport/smartcard reader, a 2D-barcode boarding pass printer, and an automated gate to facilitate all processes including check-in, ticket presentation, emigration and boarding. The departure module may incorporate a mobile, hand-held device 580, as shown in FIG. 5 that may be used by airline or security staff to increase check-in and boarding capacity when required.

In one implementation, the arrival module may use an automated gate comprising of multiple biometric scanners (fingerprint, iris, and face), and e-passport/smartcard reader and a physical obstacle (turnstile or sliding gate) to facilitate immigration.

The security services solutions may include of an extensible technology framework and a set of software modules that enable the rapid development of enrolment, administration and biometric identification applications. Biometric identification may be done at either fixed points (kiosks or gates) or using mobile devices, as in FIG. 5.

In one implementation, the system 200 may use the Daon suite of biometric middleware products, provided by Daon Crete, Ireland. The system 200 may support a wide range of biometric capture devices and matching sub-systems to provide a totally integrated solution for identify verification, for example, integrating fingerprint, iris and face recognition. The system 200 may rely on J2EE standard on a server, and may work with major database providers and operations system, and supports Java or Microsoft-based development on the client.

The travel security services may be useful in the air, land or sea passenger travel management, or in any industry, that needs large-sale secure identity verification. For the travel industry, it is designed to be connected to central reservations, departure control system, and interactive Advanced Passenger Information or "Authority to Carry" systems. The system 200 may interface with standard international civil Aviation Organization e-passports as well other contact less smart cards, enabling (for example) e-passport biometric verification on wirelessly connected mobile devices. The system 200 may also be used with national Identification cards.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. In addition, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid-state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high-speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed.

What is claimed is:

1. A computer-implemented method, comprising:
receiving, by a backend broker system, an access request, wherein the access request (i) requests access for a user to one or more secured systems, and (ii) includes biometric data associated with the user;
transmitting, by the backend broker system, a record request to one or more systems that are external to the backend broker system and that are associated with one or more databases that are external to the backend broker system, wherein the record request (i) requests one or more records associated with the user that are stored by the one or more external databases, and (ii) includes the biometric data;
receiving, by the backend broker system, the one or more records associated with the user that are stored in the one or more external databases;
evaluating, by the backend broker system, the one or more records using one or more business rules, wherein the one or more business rules specify predetermined criteria that are to be satisfied by one or more of the records for the user to gain access to the one or more secured systems;
determining, by the backend broker system, that the one or more of the records satisfy the predetermined criteria for the user to gain access to the one or more secured systems;
granting, by the backend broker system, one or more levels of access for the user to each of the one or more secured systems; and
transmitting, by the backend broker system, data indicative of the one or more levels of access to an identity card management system for storage on a smartcard.

2. The method of claim 1, where the biometric data comprises voice patterns, fingerprint/thumbprints, palm prints, hand/wrist vein patterns, retinal/iris eye scans, hand geometry/topography, keystroke dynamics, typing rhythms, signatures, and facial digital pictures.

3. The method of claim 1, where evaluating the one or more records using one or more business rules comprises:
determining that the one or more records meets a threshold level associated with the one or more secured systems; and
associating a level of access for the user to the one or more secured systems based on determining that the one or more records meets a threshold level associated with the one or more secured systems.

4. The method of claim 1, wherein the backend broker system is configured to support at least one of enrollment, identification verification initiation and identification verification completion processes.

5. The method of claim 1, further comprising associating the biometric data associated with the user with the smartcard for the user.

6. The method of claim 5, wherein the identity card management system supports issuance of the smartcard to the user.

7. A system, comprising:
a processor; and
a non-transitory computer-readable medium coupled to the processor and having instructions stored thereon, which, when executed by the processor, cause the processor to perform operations comprising:
receiving, by a backend broker system, an access request, wherein the access request (i) requests access for a user to one or more secured systems, and (ii) includes biometric data associated with the user;
transmitting, by the backend broker system, a record request to one or more systems that are external to the backend broker system and that are associated with one or more databases that are external to the backend broker system, wherein the record request (i) requests one or more records associated with the user that are stored by the one or more external databases, and (ii) includes the biometric data;
receiving, by the backend broker system, the one or more records associated with the user that are stored in the one or more external databases;
evaluating, by the backend broker system, the one or more records using one or more business rules, wherein the one or more business rules specify predetermined criteria that are to be satisfied by one or more of the records for the user to gain access to the one or more secured systems;
determining, by the backend broker system, that the one or more of the records satisfy the predetermined criteria for the user to gain access to the one or more secured systems;
granting, by the backend broker system, one or more levels of access for the user to each of the one or more secured systems; and
transmitting, by the backend broker system, data indicative of the one or more levels of access to an identity card management system for storage on a smartcard.

8. The system of claim 7, where the biometric data comprises voice patterns, fingerprint/thumbprints, palm prints, hand/wrist vein patterns, retinal/iris eye scans, hand geometry/topography, keystroke dynamics, typing rhythms, signatures, and facial digital pictures.

9. The system of claim 7, where evaluating the one or more records using one or more business rules comprises:
determining that the one or more records meets a threshold level associated with the one or more secured systems; and
associating a level of access for the user to the one or more secured systems based on determining that the one or more records meets a threshold level associated with the one or more secured systems.

10. The system of claim 7, wherein the backend broker system is configured to support at least one of enrollment, identification verification initiation and identification verification completion processes.

11. The method of claim 7, further comprising configuring, by the backend broker system, one or more settings associated with the smartcard based on the data indicative of the one or more levels of access granted to the user.

12. The system of claim 7, wherein the operations further comprise associating the biometric data associated with the user with the smartcard for the user.

13. The system of claim 12, wherein the identity card management system supports issuance of the smartcard to the user.

14. The system of claim 7, further comprising configuring, by the backend broker system, one or more settings associated with the smartcard based on the data indicative of the one or more levels of access granted to the user.

15. A computer program product, embodied in a non-transitory computer-readable medium and including instructions, which, when executed by a processor, cause the processor to perform operations comprising:

receiving, by a backend broker system, an access request, wherein the access request (i) requests access for a user to one or more secured systems, and (ii) includes biometric data associated with the user;

transmitting, by the backend broker system, a record request to one or more systems that are external to the backend broker system and that are associated with one or more databases that are external to the backend broker system, wherein the record request (i) requests one or more records associated with the user that are stored by the one or more external databases, and (ii) includes the biometric data;

receiving, by the backend broker system, the one or more records associated with the user that are stored in the one or more external databases;

evaluating, by the backend broker system, the one or more records using one or more business rules, wherein the one or more business rules specify predetermined criteria that are to be satisfied by one or more of the records for the user to gain access to the one or more secured systems;

determining, by the backend broker system, that the one or more of the records satisfy the predetermined criteria for the user to gain access to the one or more secured systems;

granting, by the backend broker system, one or more levels of access for the user to each of the one or more secured systems; and transmitting, by the backend broker system, data indicative of the one or more levels of access to an identity card management system for storage on a smartcard.

16. The computer program product of claim 15, where evaluating the one or more records using one or more business rules comprises:

determining that the one or more records meets a threshold level associated with the one or more secured systems; and associating a level of access for the user to the one or more secured systems based on determining that the one or more records meets a threshold level associated with the one or more secured systems.

17. The computer program product of claim 15, wherein the backend broker system is configured to support at least one of enrollment, identification verification initiation and identification verification completion processes.

18. The computer program product of claim 15, wherein the operations further comprise associating the biometric data associated with the user with the smartcard for the user.

19. The computer program product of claim 18, wherein the identity card management system supports issuance of the smartcard to the user.

20. The computer program product of claim 15, wherein the operations further comprise configuring, by the backend broker system, one or more settings associated with the smartcard based on the data indicative of the one or more levels of access granted to the user.

* * * * *

UNITED STATES PATENT AND TRADEMARK OFFICE
CERTIFICATE OF CORRECTION

PATENT NO. : 8,325,989 B2  
APPLICATION NO. : 12/056723  
DATED : December 4, 2012  
INVENTOR(S) : Daniel Mellen, Paul Kolebuck and Gayle Nix Page 1 of 1

It is certified that error appears in the above-identified patent and that said Letters Patent is hereby corrected as shown below:

In the Claims:

In claim 11, column 16, line 56, delete "claim 7," and insert -- claim 1, --, therefor.

Signed and Sealed this  
Thirtieth Day of April, 2013

Teresa Stanek Rea  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,325,989 B2 | Page 1 of 1 |
| APPLICATION NO. | : 12/056723 | |
| DATED | : December 4, 2012 | |
| INVENTOR(S) | : Mellen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this
Thirtieth Day of December, 2014

Michelle K. Lee
*Deputy Director of the United States Patent and Trademark Office*